(12) United States Patent
Zhang (10) Patent No.: US 10,794,764 B2
(45) Date of Patent: Oct. 6, 2020

(54) DOUBLE-CHANNEL MINIATURIZED RAMAN SPECTROMETER

(71) Applicant: ULSee Inc., Taipei (TW)

(72) Inventor: Evan Y. W. Zhang, Hangzhou (CN)

(73) Assignee: ULSee Inc., Taipei (TW)

(*) Notice: Subject to any disclaimer, the term of this patent is extended or adjusted under 35 U.S.C. 154(b) by 90 days.

(21) Appl. No.: 15/992,351

(22) Filed: May 30, 2018

(65) Prior Publication Data

US 2019/0086260 A1 Mar. 21, 2019

(30) Foreign Application Priority Data

Sep. 15, 2017 (CN) .......................... 2017 1 0830826

(51) Int. Cl.
| | | |
|---|---|---|
| *G01J 3/02* | (2006.01) | |
| *G01J 3/44* | (2006.01) | |
| *G01J 3/10* | (2006.01) | |
| *G01J 3/28* | (2006.01) | |

(52) U.S. Cl.
CPC .......... *G01J 3/0256* (2013.01); *G01J 3/0208* (2013.01); *G01J 3/0229* (2013.01); *G01J 3/0248* (2013.01); *G01J 3/0264* (2013.01); *G01J 3/10* (2013.01); *G01J 3/2803* (2013.01); *G01J 3/44* (2013.01)

(58) Field of Classification Search
CPC ...... G01J 3/0208; G01J 3/0229; G01J 3/0248; G01J 3/0256; G01J 3/0264; G01J 3/10; G01J 3/2803; G01J 3/44; G01J 3/0294
See application file for complete search history.

(56) References Cited

U.S. PATENT DOCUMENTS

| | | | | |
|---|---|---|---|---|
| 5,442,438 | A | * 8/1995 | Batchelder | G01J 3/12 356/301 |
| 8,699,020 | B1 | * 4/2014 | Zhou | G01J 3/0264 356/301 |
| 2004/0004715 | A1 | * 1/2004 | Tuschel | C08K 9/02 356/301 |
| 2015/0077743 | A1 | * 3/2015 | Maznichenko | G01J 3/44 356/301 |
| 2016/0131576 | A1 | * 5/2016 | Cabib | G01N 21/3504 250/330 |
| 2017/0138860 | A1 | * 5/2017 | Huang | A61B 5/0075 |
| 2018/0067053 | A1 | * 3/2018 | Aizawa | G01N 21/65 |
| 2018/0328786 | A1 | * 11/2018 | Lambert | G01J 3/0248 |
| 2019/0250105 | A1 | * 8/2019 | Mahadevan-Jansen | G01J 3/0218 |

* cited by examiner

*Primary Examiner* — Hina F Ayub
(74) *Attorney, Agent, or Firm* — Alan D. Kamrath; Karin L. Williams; Mayer & Williams PC (57) ABSTRACT

A double-channel miniaturized Raman spectrometer includes a sequentially-connected near-infrared laser diode or near-ultraviolet laser emitter, a collimated laser beam expander, a first beam splitter that retards laser light but penetrates laser light and Raman light, a cylindrical or spherical objective lens with or without zooming, a second beam splitter that retards laser light but penetrates Raman light, a relay optical system, a slit, two spectral lens, a plurality of line-array or matrix-array CCD or CMOS detectors, a GPS, and a data processing and wireless transceiver system. After the laser channel photographing a target and aligning an optical axis and a Raman channel to measure the sample, the data is wirelessly sent to a cell phone and a cloud computer for spectrum separation, peak search, spectral library establishment, material identification and the like in order to obtain a quick conclusion.

9 Claims, 11 Drawing Sheets

DOUBLE-CHANNEL MINIATURIZED RAMAN SPECTROMETER

FIELD OF THE DISCLOSURE

The present disclosure relates to a Raman spectrometer, and more particularly to a double-channel miniaturized Raman spectrometer relates to on-site measurement of various residual substances.

BACKGROUND OF THE INVENTION

Raman spectra are one kind of scattering spectra. In year 1928, C. V Raman did experiments and found that when the light passes through a transparent medium, the frequency of the light scattered by molecules changes due to acquisition or loss of energy, and this phenomenon is called Raman scattering.

In the scattering spectrum of the transparent media, the composition whose frequency is the same as the incident light frequency $\upsilon_0$ is called Rayleight scattering; and the spectrum whose frequency is symmetrically distributed on both sides of the incident light frequency $\upsilon_0$ or the spectrum with $\upsilon_0 \pm \upsilon$ is called Raman scattering or Raman spectrum, wherein the scattering of $\upsilon_0 - \upsilon$ is called Stokes scattering, which is easy to happen and has more researches; and the scattering of $\upsilon_0 + \upsilon$ is called anti-Stokes scattering, which is less likely to happen and has less researches. Any material is composed of atoms and molecules, and they are constantly vibrating and rotating. Raman spectroscopy method can be used to detect the vibration and rotation of the material molecules. Molecular vibration and rotation spectrum is unique, which is equivalent to the fingerprints of the materials. Therefore, the composition of different substances can be accurately determined through the analysis of Raman spectroscopy, which is much more accurate than general wide-spectrum spectrometer. The position of the Raman spectrum does not change with the wavelength of laser light and environment change and is unique. Its application range covers almost all fields of material, chemistry, physics, biology and medicine, and is of great value for qualitative analysis, semi-quantitative analysis, and detection of molecular structure. However, the sensitivity of the Raman spectrum is not high since it is a scattering spectrum and not the absorption spectrum. If the cross-section of the measured material is below $10^{-27}$ (cm²/melecule·srd), it is often undetectable. Hence, the existing near-infrared and visible Raman spectroscopy can only detect the milligram-level materials visible to human eyes and cannot detect materials invisible to human eyes. Additionally, traditional Raman spectrometer adopts a spherical objective lens, which may detonate explosives when detecting the explosives since its focus is too small. For convenience, an optical fiber combined with a slit is used, which causes a great loss of light energy. If a large reflector C-T structure with the F value of 4 is used in the spectrometer, the luminous flux will be very small. If linear CCDs or COMSs are used as the detector, the light energy whose direction is vertical to the slit will be wasted after the light passes through the slit. If a power-hungry touch screen (the touch screen can only display curves and is non-interpretable since it's not a computer) or a large-sized notebook is adopted, it's inconvenient for carrying and usage. Hence, the objective of the present disclosure is to overcome all of the-abovementioned drawbacks.

SUMMARY OF THE INVENTION

In view of the above-mentioned problems, a Raman spectrometer is provided in the present disclosure, and more particularly to a double-channel miniaturized Raman spectrometer relates to on-site measurement of various residual substances. The Raman spectrometer of the present disclosure has the advantages of small size, convenient carrying and usage, and its measurement results can be seen anywhere the Internet is available, while its sensitivity and resolution are higher than those of similar products.

It is one objective of the present disclosure to provide a double-channel miniaturized Raman spectrometer with on-site measurement of various residual substances.

According to one exemplary embodiment of the present disclosure, a double-channel miniaturized Raman spectrometer with on-site measurement of various residual substances is provided. The double-channel miniaturized Raman spectrometer includes a plurality of sequentially-connected near-infrared laser diodes or near-ultraviolet laser emitters, a collimated laser beam expander, a first beam splitter, that retards laser light but penetrates laser light and Raman light, an objective lens with or without zooming, a second beam splitter, that retards laser light but penetrates Raman light, a slit, a relay optical system, for imaging the laser light and the Raman light scattered from illumination points on a target onto the slit for direct alignment without using optical fibers for indirect alignment, two spectral lens, a plurality of line-array or matrix-array CCD or CMOS detectors, a GPS, and a data processing and wireless transceiver system.

According to one exemplary embodiment of the present disclosure, 1-10% area in a middle part of a glass substrate of the first beam splitter is coated with a high-reflection film that retards laser light but penetrates Raman light, and the remaining 90-99% area in the middle part of the glass substrate of the first beam splitter is coated with an anti-reflective film that penetrates laser light and Raman light, such that the first beam splitter is capable of retarding laser light and penetrating laser light.

Two types of spectrum-forming systems are provided in the present disclosure. The first type of spectrum-forming system includes a lens with a small F value, a grating, and a plurality of near-infrared or near-ultraviolet matrix-array CCD. The second type of spectrum-forming system includes a narrow-band tunable filter with rotating angle or an acousto-optic/liquid crystal tunable filter, and a photomultiplier or an avalanche photodiode (APD).

The data processing and wireless transceiver system transmits GPS, Raman spectrum, and the laser image to a mobile phone and a cloud computer for laser image display, Raman spectrum display, peak location, overlapping peak separation, establishment of spectral library, and/or material identification in order to obtain a result.

Two types of spectrum-forming systems are provided in the present disclosure. The first spectrum-forming system uses a first lens and a grating for dispersion, and then uses a second lens of the same or similar type for imaging the dispersed Raman light onto the matrix-array CCD or CMOS detectors, wherein the F value of the first lens and the grating of the spectrum-forming system is 2 and the size of the first lens and the grating of the spectrum-forming system is two times of the relay lens; and wherein the matrix-array CCD or CMOS detectors form a spectrum in many pixels in the z-direction, and accumulate signals in many pixels in the y-direction to increase a signal-to-noise ratio, such that a hyperspectral is obtained if the matrix-array CCD or CMOS detectors are scanned in the z-direction for both forming the spectrum and imaging. The second spectrum-forming system uses a narrow-band tunable filter with rotating angle or an acousto-optic/liquid crystal tunable filter for dispersion, and a wavelength-by-wavelength tuning scan is performed on a single or multiple photodiodes (PD), photomultipliers (PMT), ICCD or avalanche photodiodes (APD) using a lens in order to form a spectrum; such that a hyperspectral is obtained if the matrix-array CCD or CMOS detectors are adopted. No matter which type of spectrum-forming system disclosed in the present disclosure is adopted, its sensitivity can be at least 10 times higher than the sensitivity of other spectrum-forming system having a size 5 times larger than it on the market.

According to one exemplary embodiment of the present disclosure, there wireless transceiver system sends the laser image and the Raman spectrum to a mobile phone for display and simple interpretation; and then all data are sent to a cloud computer, and Matlab, Labview, and/or Wavelet are used for overlapping peak separation, rapid peak search, and comparison with a large database in order to obtain a conclusion to be transmitted to the mobile phone. Therefore, the present disclosure can make the size of the Raman spectrometer the same small as a business card since a power-hungry touch screen and a large-sized notebook are not required, which is convenient for carrying and usage, and its measurement and interpretation results can be seen by interested users anywhere the Internet is available.

For the above-mentioned double-channel miniaturized Raman spectrometer, wherein a design of the near-ultraviolet Raman spectrometer is the same as that of the near-infrared Raman spectrometer, except that their laser wavelengths are different (200-270 nm), the optical element and the detector work in the near-ultraviolet band, the F values of the objective lens are the same, but the size of the near-ultraviolet Raman spectrometer is two times of the size of the near-infrared Raman spectrometer. Due to the short-wavelength resonance effect, the experimental results of the present disclosure can prove that the sensitivity of the near-ultraviolet Raman spectrometer is 100-1000 times of the sensitivity of the near-infrared Raman spectrometer, and the near-ultraviolet Raman spectrometer can perform an unshielded measurement in sunlight.

These and other objectives of the present disclosure will no doubt become obvious to those of ordinary skill in the art after reading the following detailed description of the preferred embodiment that is illustrated in the various figures and drawings.

DESCRIPTION OF THE PREFERRED EMBODIMENTS

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

The intensity of the Raman signal is determined by the following formula:

$$I = CNI_0 \sigma \Omega S F(T) \tag{1}$$

Where I is the intensity of the Raman light, C is a constant, N is a molecular number density, $I_0$ is the intensity of the incident light, $\sigma$ is the effective Raman scattering cross-sectional area, $\Omega$ is the Raman scattering solid angle collected by the receiving aperture, S is the effective laser irradiation area corresponding to the receiving aperture, and F(T) is a function of the influence of the representative temperature on the measured object, the laser and the receiving system. For a fixed laser power and the measured material, the available parameters are generally only $\sigma$, $\Omega$, and S. Where $\sigma$ is the effective Raman scattering cross-sectional area. For a given material, $\sigma$ is only related to the laser frequency. The relationship between $\sigma$ and the incident laser light frequency is determined by the following formula:

$$\sigma_{mn}(\upsilon_0) = K \upsilon_0 (\upsilon_0 - \upsilon_{mn})^3 \left[ \frac{\upsilon_e^2 + \upsilon_0^2}{(\upsilon_e^2 - \upsilon_0^2)^2} \right]^2. \tag{2}$$

Where $\sigma_{mm}(\upsilon_0)$ is the effective Raman scattering cross-sectional area of a laser light with the incident frequency of $\upsilon_0$ when a molecule performs a transition from the energy level m to the energy level n, and $\upsilon_{mn}$ is the Raman shift of the molecule. The formula indicates that: the effective Raman scattering cross-sectional area $\sigma_{mn}(\upsilon_0)$ is proportional to the fourth power of the laser light frequency $\upsilon_0$, or is inversely proportional to the fourth power of the wavelength $\lambda_0$. Therefore, the shorter the wavelength of the laser light the stronger the Raman scattering. When the incident light frequency $\upsilon_0$ is close to the resonance frequency $\upsilon_e$ that the molecule can perform a transition between energy levels, the difference of $(\upsilon_{e2} - \upsilon_{02})$ tends to zero, and the Raman scattering will be dramatically increased (up to 106) to create a resonance. As indicated from the experimental result that a laser light with a wavelength of 229 nm is adopted, the Raman scattering cross-sectional area of most materials can be increased up to more than 1000 times. This phenomenon only occurs in the near-ultraviolet region below 270 nm due to the resonance frequency $\upsilon_e$ is very high, and it won't occur in the near-infrared region or in the visible region. In addition, the Raman light and fluorescence light can be separated without interfering with each other only in the near-ultraviolet region and the deep-ultraviolet region. These advantages can only be obtained in the near-ultraviolet Raman system of the present disclosure and cannot be obtained in the near-infrared Raman system, for which reason we have to find another solution.

Ω is the Raman scattering solid angle collected by the receiving aperture, and it consists of two parts. For the purpose of increasing Ω, one is that to have a larger acceptance angle of the objective lens in order to collect as much Raman light generated by the target as possible, and the other is that to have a larger acceptance angle of the spectrometer in order to transmit as much Raman light as possible to the detector. A high-magnification microscope lens can be used for increasing the acceptance angle of the objective lens, but its distance will usually become very short, wherein objects cannot be measured directly and a special sample placed under the microscope is required. Furthermore, too small focus will detonate explosives or burn the sample, hence, a low-magnification microscope lens is selected or an objective lens with or without zooming is adopted in a portable device, rather than selecting a microscope lens. A cylindrical objective lens is adopted in the present disclosure, so that the illumination points match with the rectangular slit and the matrix-array detectors in order to greatly improve the signal-to-noise ratio. As a result, not only does the focus become larger, but it also helps to avoid detonating explosives within a range for exciting the Raman light and to shorten the time for scanning the sample. To increase the acceptance angle of the spectrometer, a holographic grating can be used for lowering the F value from 4 to 1.3, but its volume and cost will be increased. A reflector C-T structure with F=4 is not adopted in the present disclosure, and a lens structure with F=2 is adopted in the present disclosure, such that not only the volume is small but also the luminous flux is increased by 4 times. What remains to be done is how to make this large and round Raman light spot pass through the long and narrow slit to reduce light loss. Two solutions have been used in the present disclosure: first, an optical fiber bundle of a point-transfer-line made by dozens of optical fibers is used to make the large and round Raman light spot exactly match the long and narrow slit, but the light energy loss will be more than a half; and second, virtual slit is adopted for cutting the large and round light spot into a few pieces of thin and narrow slit-like lights, such that the long and narrow slit is not required, however, the optical structure of the virtual slit is more complex and has a large volume, which is difficult to be installed at the entrance of the spectrometer. Both of these two solutions have disadvantages and are not desirable for the miniaturized Raman spectrometer. Another scheme is adopted in the present disclosure, an objective lens having a small F value is adopted without using an optical fiber lens directly coincident with the slit, a spectrum-forming lens having the F value F=2 is adopted without using a spectrum-forming lens having the F value F=4, matrix-array detectors are adopted without using liner-array detectors, such that the signal-to-noise ratio can be improved to at least 10 times. S is the effective laser irradiation area corresponding to the receiving aperture. The direct way for increasing the irradiation area and for keeping stimulating the Raman light is to increase the power of the laser and to use the short-wavelength laser. However, when the laser is selected, its S cannot be changed.

Two schemes are provides in the present disclosures. In the first type of spectrum-forming system, 1-10% area in a middle part of a glass substrate of the first beam splitter is coated with a high-reflection film that retards laser light but penetrates Raman light, and the remaining 90-99% area in the middle part of the glass substrate of the first beam splitter is coated with an anti-reflective film that penetrates laser light and Raman light, such that both the laser light and the Raman light reflected from the target are allowed to enter the relay optical system through the first beam splitter, and then the laser light and the Raman light are separated by the second beam splitter and mixed together again. It does not matter if the first beam splitter blocks a portion of the laser light (even if it is 20%), the first beam splitter still can image the laser camera with enough laser light due to the strong reflected laser light. This channel can provide the exact positions and focus of the optical axis and the laser scanning points, which is easy for system setup and measurement. It can also expand the beam to illuminate the entire target and obtain the light intensities of different scattering angles from different pixels on the camera to measure the particle sizes of different substances in the target, which is benefit for the measurement of water particles and some gas particles. Because the entire first beam splitter is coated with a dielectric film that penetrates the Raman light, the middle part that is coated with the laser reflective film has no effect on the collection of weak Raman light. A high-resolution spectrum can be provided by using the Raman light passing through the second beam splitter, which can detect the materials of the target. If the target is an invisible fingerprint of a suspect, the laser imaging may show the fingerprinting to know who he/she is, and the Raman result can detect the explosives, drugs, or blood etc. that the finger touched, knowing what he/she has done, and then the data is wirelessly transmitted to the mobile phone and then to the Security Bureau, such that this case can be quickly solved which is impossible for any other instruments.

The portion ahead of the spectrometer in the second embodiment is the same as that in the first embodiment, and the difference between these two embodiments is that: rather than using a grating as the dispersive element nor using the CCD/CMOS for obtaining spectra, a narrow-band tunable filter with rotating angle or an acousto-optic/liquid crystal tunable filter is used as the dispersive element, and one or more photomultipliers (PMT), ICCD or avalanche photodiodes (APD) with high sensitivity are used as the detector for obtaining spectra. In this way, since there is not slit, there is no limit to the sampling points and the sampling points can be very large as long as the Raman signal is strong enough. If the ICCD is used as the detector, both imaging and obtaining spectra can be performed so as to obtain hyperspectral, which is very beneficial for both imaging and obtaining spectra when detecting fingerprints.

The present disclosure will be described in detail with reference to the accompanying drawings and specific embodiments. Be noted that the embodiments and the descriptions of the present disclosure are merely used to explain the present disclosure, and are not intended to limit the present disclosure.

Embodiment 1

Figure 1:
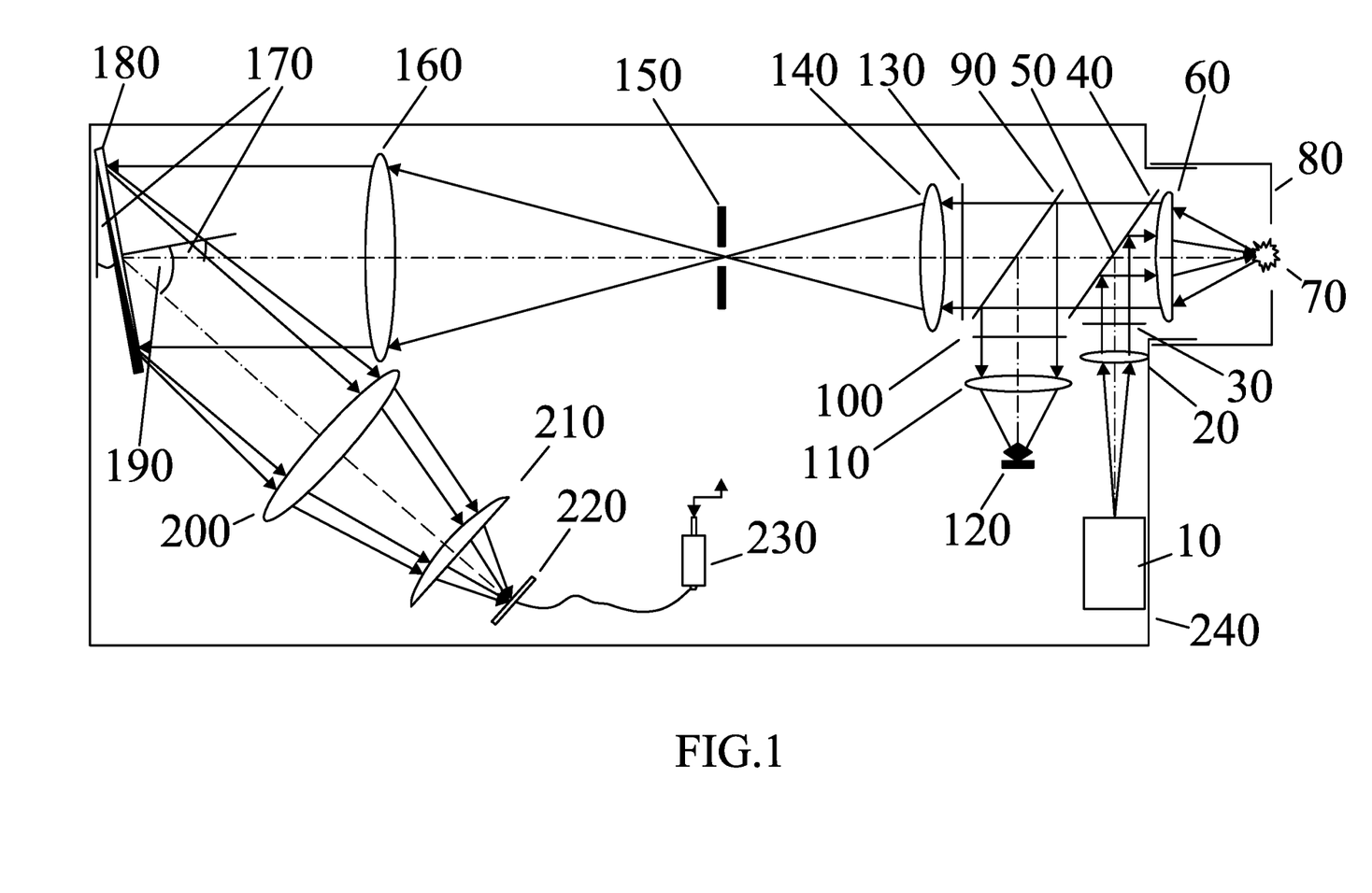
FIG. 1 is a schematic diagram of a double-channel miniaturized Raman spectrometer according to a first embodiment of the present disclosure.

As shown in FIG. 1, the laser diode 10 emits a near-infrared light having a wavelength of 785 nm and a rectangular-shaped light spot of 0.2 mm×1 mm. After that, the near-infrared light is shaped into a parallel light by the collimator 20 with a longer focal length, the light beam of the parallel light is confined to about 785 nm by the narrow-band filter 30, and the light is emitted to a central portion 50 of the first beam splitter 40. The laser light is almost totally reflected and focused onto the target 70 by a cylindrical objective lens 60 with a short focal length. The multiples at which the illumination point is compressed in the Z direction (the optical axis perpendicular to the paper and the X direction) are the ratio of the focal length of the collimator to the focal length of the objective lens, and the length in the Y direction (perpendicular to the optical axis along the paper) is still 1 mm, so it is a rectangle with a shorter length in the Z direction and a longer length in the Y direction. The diameter of the objective lens is ¼" (i.e., 6.35 nm, and the size of the beam splitter is only 6.35×8.98 mm². In order to avoid the interference of sunlight and ambient light, the objective lens barrel has a light-blocked rubber cover 80 whose length is exactly the focal length of the objective lens. Therefore, the objective lens can focus on the target and the interference of ambient light can be avoided, when the light-blocked rubber cover 80 is placed on the target.

The laser light scattered by the target 70 located at the focal point is collected by the objective lens into the parallel light, and most of the parallel light can be transmitted through the beam splitter 40 except for the central portion 50. This type of beam splitter, which can both totally-reflect the incident laser light and penetrate most of the scattered laser light, is a major feature of the present disclosure. The excited and scattered Raman light can be completely passed through the beam splitter 40. When it reaches the second beam splitter 90, the laser light with a wavelength shorter than 790 nm is reflected onto the filter 100 to be imaged onto the matrix-array CCD 120 through the lens 110 in order to obtain a laser image of the target, such that the location of the measured point relative to the target can be obtained. The center point is the laser illumination point and the optical axis, which can be used for system calibration. If the scattering method is used for measuring the size of different particles on the target, the scattering angle can be measured, that is, the light intensity received by different pixels corresponding to different scattering angles from the center to the edge on the focal plane of the CCD can be measured. The Raman light transmitted through the beam splitter 90 is further filtered by the long-pass filter 130 to remove residual laser light, and then is imaged onto the slit 150 by the relay lens 140, wherein the focal length of the relay lens 140 is generally greater than the focal length of the objective lens. For example, if the F value of the objective lens is 1, the relay lens with the F value of 2 can be selected, such that the rectangular illumination point on the target will be magnified by 2 times to match the shape of the slit (the height in the Y direction is generally 3 mm, and the length in the Z direction can be selected as between 25-100 μm depending on the resolution of the instrument). To reduce the loss of light energy and volume, traditional optical fiber is not used to couple the slit.

The divergent Raman light emitted from the slit is collected into the parallel light by the first ceiling lens 160 having a longer focal length and a larger aperture (for example, the focal length of the first ceiling lens 160 is twice of the focal length of the relay lens, and the aperture of the first ceiling lens 160 is twice of the aperture of the relay lens), and then the parallel light is emitted onto the grating 180. The incident angle is indicated by 170, and the +1 level diffraction angle is indicated by 190. If the incident angle and the diffraction angle are located at the same side of the normal of the grating, the diffraction angle can be calculated by the following formula:

$$\sin\theta + \sin\varphi = \lambda/d \qquad (3).$$

In the formula (3) above, $\theta$ indicates the incident angle, $\varphi$ indicates the diffraction angle, $\lambda$ indicates the wavelength, and d indicates the grating constant. After the Raman spectral range is set, the initial diffraction angle $\varphi_1$ corresponding to the initial Raman wavelength $\lambda_1$ and the final diffraction angle $\varphi_2$ corresponding to the final Raman wavelength $\lambda_2$ can be obtained. Based on this, the opening angle ($\varphi_2 - \varphi_1$) of the Raman spectrum and the focal length of the second spectroscope can be obtained, and it is also possible to calculate the spectral resolution of the system.

The +1 level diffraction light is condensed by the second spectral lens 200, and is compressed in the Y direction by the cylindrical lens 210 to be imaged on the matrix-array detectors CCD/CMOS 220. The matrix-array detectors CCD/COMS have 2048 pixels with 14×200 μm in the Z direction and have 128 pixels in the Y direction, which can accumulate the signal for increasing the signal-to-noise ratio to about 11 times. Compared with the optical fiber coupling slit (with a 50% loss of fiber-optic transmission and a 50% loss of light-blocking slit), the gain of the present disclosure can be increased by at least 4 times. Compared with the T-C reflector dispersion system with F=4, the gain of the present disclosure is increased by at least 4 times. The signal-to-noise ratio of the present disclosure is at least 4×4×11=176 times higher than other Raman spectrometer on the market having a volume 5 times larger than that of the Raman spectrometer of the present disclosure, which is a great improvement. Since a 25 μm direct-coupled slit and a 1800-line grating are used in the present disclosure, the system resolution of the present disclosure is at least two times higher than most systems available in the market that use a 100 μm optical fiber-coupled slit and a 1200-line grating. The laser image and spectral data are sent to the mobile phone and cloud computer by the wireless transceiver system 230 for processing and interpretation. The entire system, including the circuit board and the battery, is disposed in a housing 240, and its size is about 74×63×26 mm³, which is almost the same as a business card but has a slightly-thicker width.

Figure 2:
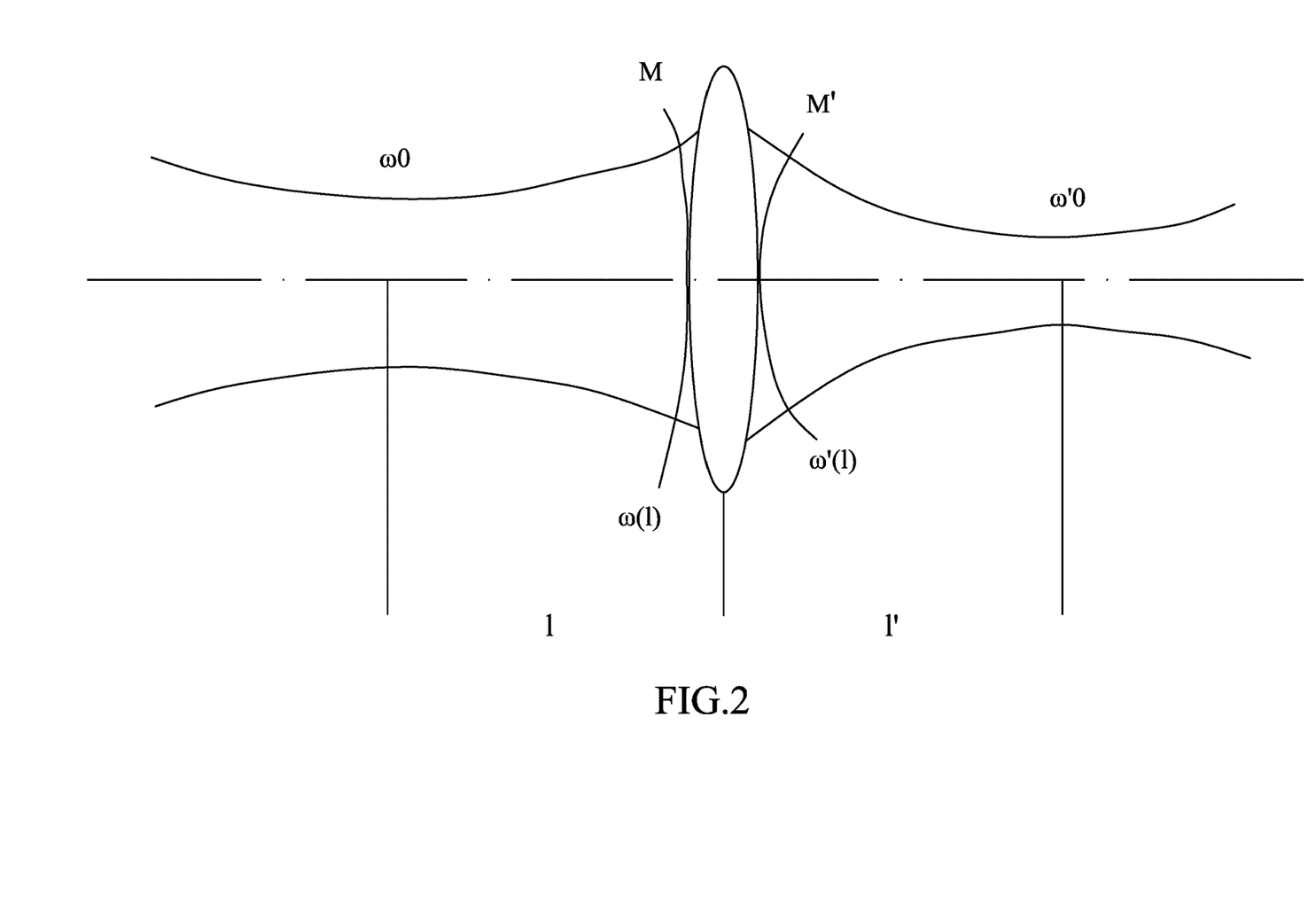
FIG. 2 is a schematic diagram of laser lumbar imaging.

Due to the parallel light incident to the object lens with a divergence angle of 2 $\theta$, the size of the focused waist spot is not related to the size of the original laser spot and is only related to the divergence angle, if the laser light is used as a Gaussian beam. If the focal length of the objective lens is f, the size of the focus point is 2f$\theta$. The principle is as follows: the Gaussian beam is still the Gaussian beam after it is transmitted through the objective lens, only the beam waist position and beam waist radius are changed. As shown in FIG. 2, the beam waist radius of the input Gaussian beam is indicated by $\omega_0$, the distance from the objective lens is indicated by l, the focal length of the objective length is indicated by f, and thus the waist radius $\omega'_0$ of the output Gaussian Beam and the output distance l' from the objective lens can be calculated by using the Gaussian beam transmission principle, which respectively satisfy the following formulas:

$$l' = f + [(l-f)f^2]/[(l-f)^2 + (\Pi\omega_0^2/\lambda)^2] \qquad (4); \text{ and}$$

$$\omega'_0{}^2 = \omega_0^2/[(1-l/f)^2 + (\Pi\omega_0^2/\lambda)^2/f^2] \qquad (5).$$

As can be seen from the above formulas, if the beam waist of the input Gaussian beam is located in the front focal plane of the objective lens, that is, $1=F$, the beam waist of the output Gaussian beam is located in the back focal plane of the objective lens. At this time, the beam waist radius is expressed by:

$$\omega'_0 = \lambda f / \Pi \omega_0 \qquad (6).$$

The half-divergence angle of the input Gaussian beam approximately satisfies the following formula:

$$\theta = \lambda / \Pi \omega_0 \qquad (7).$$

Obviously, for a Gaussian beam whose beam waist is located at the front focal plane of the lens, its spot diameter at the focal plane of the lens satisfies the following formula:

$$d = 2f\theta \qquad (8).$$

In other words, in the light path simulation, the Gaussian beam can be viewed as infinite light with a certain emission angle. Please refer to FIG. 3. At this time, the position of the beam waist of the input Gaussian beam is equivalent to the entrance pupil of the optical system, and the divergence angle corresponds to the angle of view. The minimum spot is located on the focal plane of the lens, and its size is in accordance with the above formulas. The output laser beam is a Gaussian beam, and the Gaussian beam propagates through the lens, which is different from the plane wave.

Figure 3:
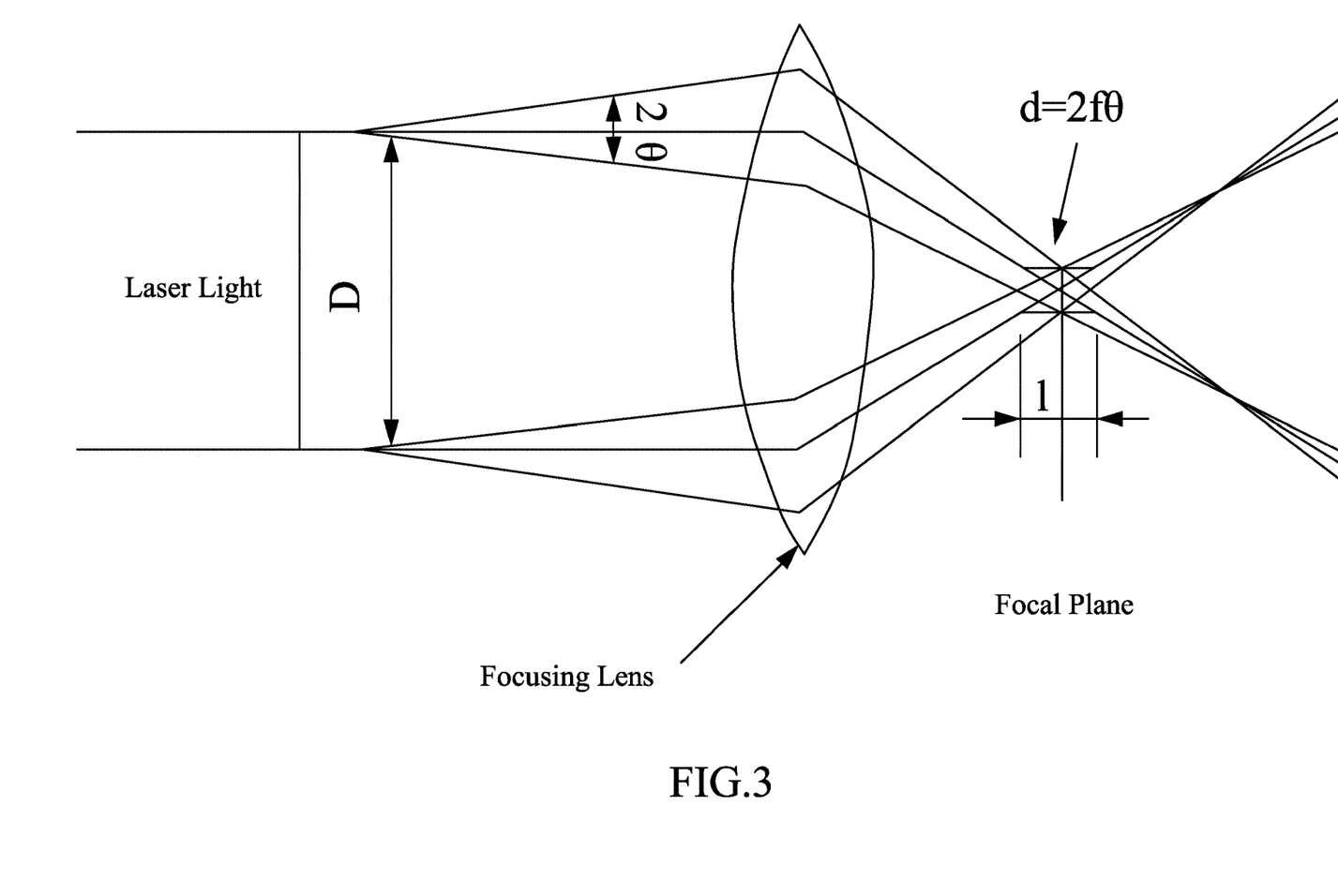
FIG. 3 is a dimension diagram for laser focus.

As can be seen from the above analysis, the divergence angle of the laser machine will be reduced by the collimator to cause a decrease of the spot, which is not necessarily favorable for the system having a requirement of a larger irradiation area. For this reason, the collimator may be used or not, depending on the circumstances.

Embodiment 2

Although the above-mentioned design can form a spectrum quickly, it spends a long time to perform a two-dimensional scanning to check the entire target since the detection point is very small. In addition, the sensitivity of the CCD in the spectrometer is not high enough. In order to overcome these disadvantages, a grating is not used as the dispersive element and the CCD is not used as the detector. Instead, a narrow-band tunable filter with rotating angle or an acousto-optic/liquid crystal tunable filter, and a photomultiplier or an avalanche photodiode (APD) are used. This type of system has the advantages of high sensitivity, no slits, and no limitation on the size of the detection point. The disadvantages of this type of system are that: the waveforms of the spectrum are scanned one by one, so the speed for forming the spectrum is slowly. It can image the entire target to obtain a hyperspectral if the laser light is stronger and the ICCD is adopted.

Figure 4:
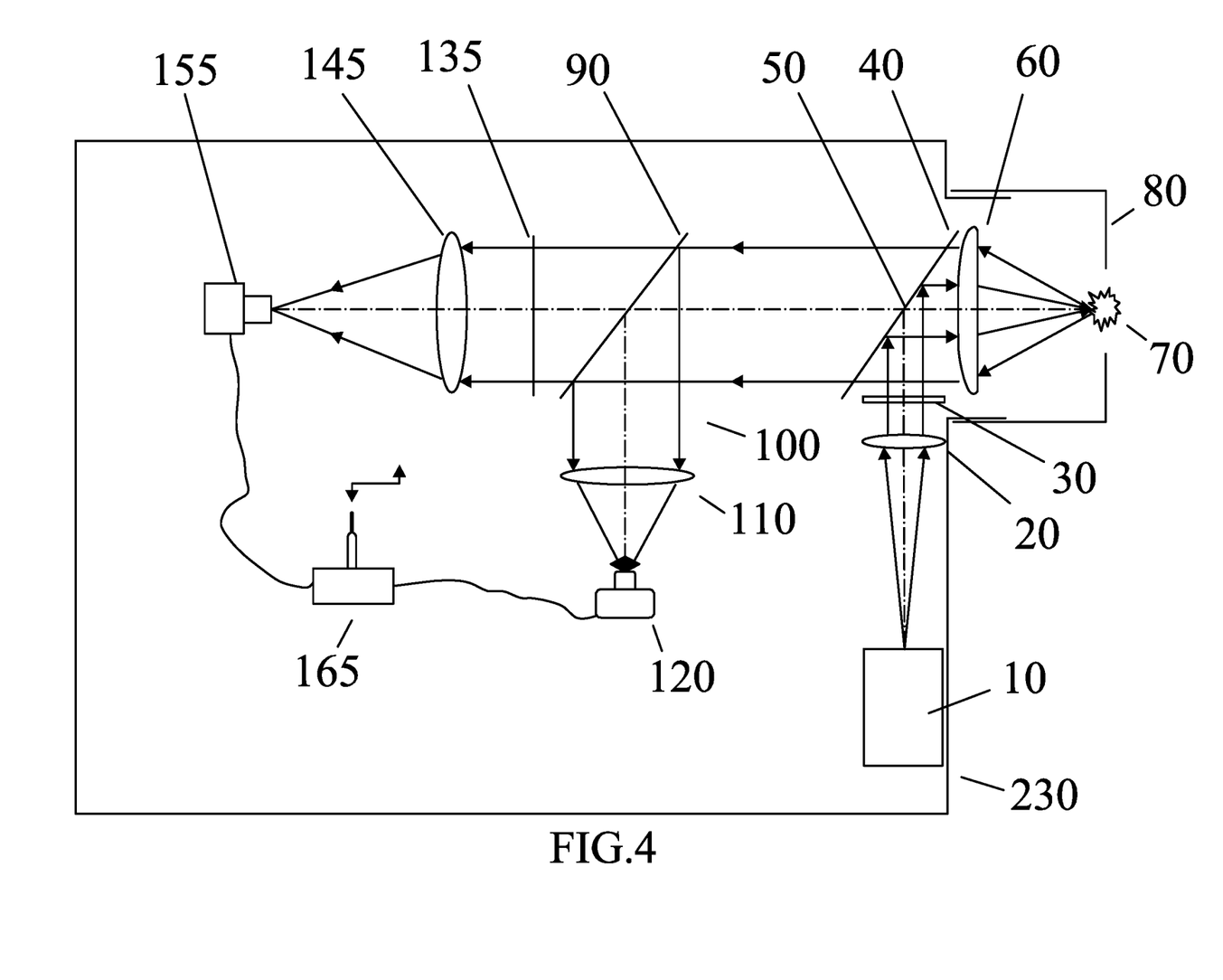
FIG. 4 is a schematic diagram of a double-channel miniaturized Raman spectrometer according to a second embodiment of the present disclosure.

FIG. 4 is a schematic diagram of a double-channel miniaturized Raman spectrometer according to a second embodiment of the present disclosure, which uses a narrow-band tunable filter with rotating angle and a PMT or APD detector. The portion ahead of the spectrometer in the second embodiment is the same as that in the first embodiment, except that the system in the second embodiment does not use a grating as the dispersive element and the slits. When the laser light and the Raman light reach the second beam splitter 90, the shorter laser light is reflected onto the CCD/CMOS 120 for imaging, but the Raman light passes through the second beam splitter 90. The Raman light is imaged onto a PMT 155 that detects Raman spectrum by the narrow-band tunable filter with rotating angle or the acousto-optic/liquid crystal tunable filter 135 and the imaging lens 145. If a photomultiplier imaging CCD (i.e., ICCD) is adopted as the detector, the fingerprint can be imaged while the target (such as, a fingerprint) is obtained in order to obtain a hyperspectral. The two signals are outputted to the wireless transceiver system 165 and then sent to a mobile phone and a cloud computer with data processing and identification systems for interpretation.

Figure 5:
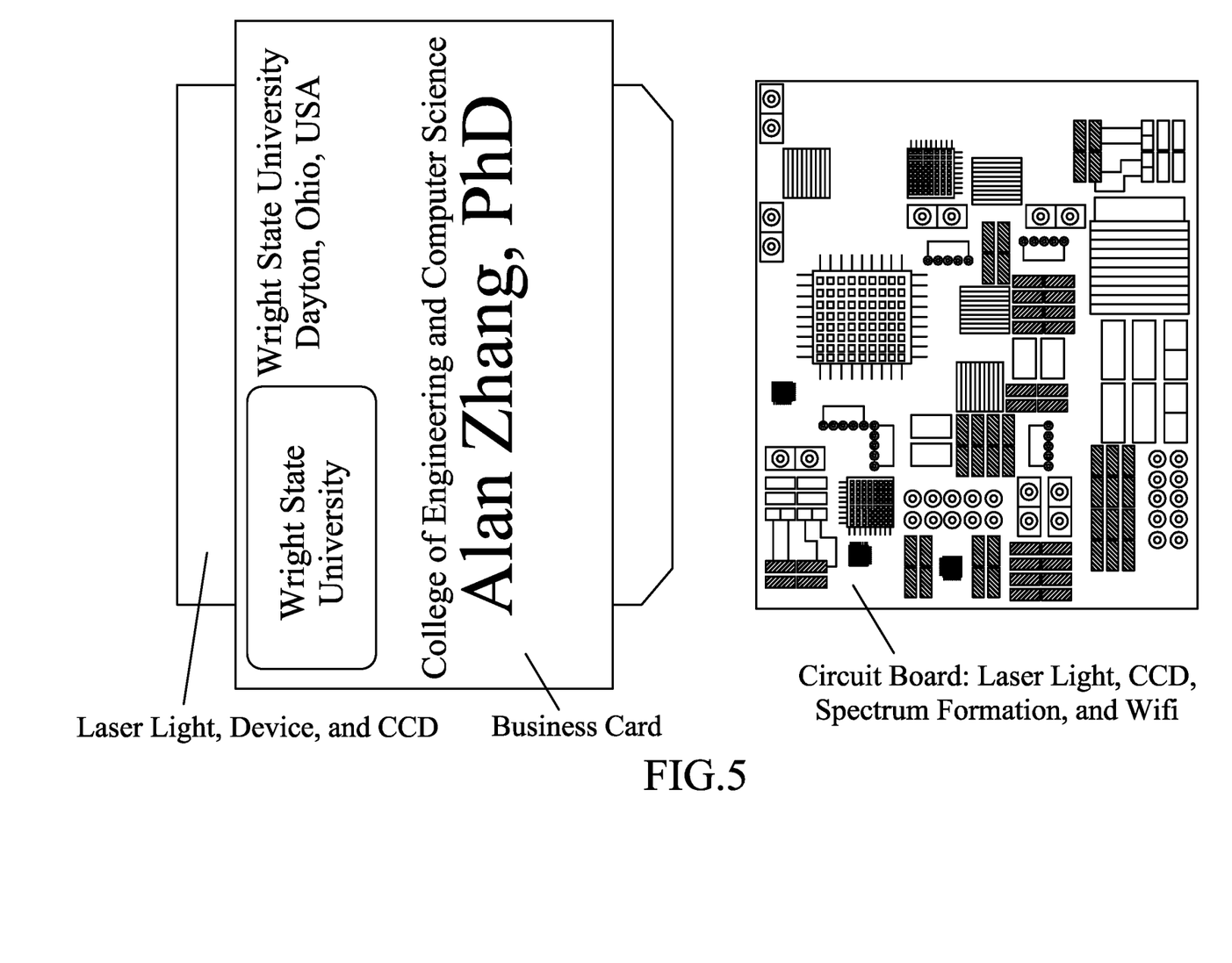
FIG. 5 is a schematic diagram of a prototype of the world's smallest Raman spectrometer produced according to the first embodiment of the present disclosure.
Figure 6:
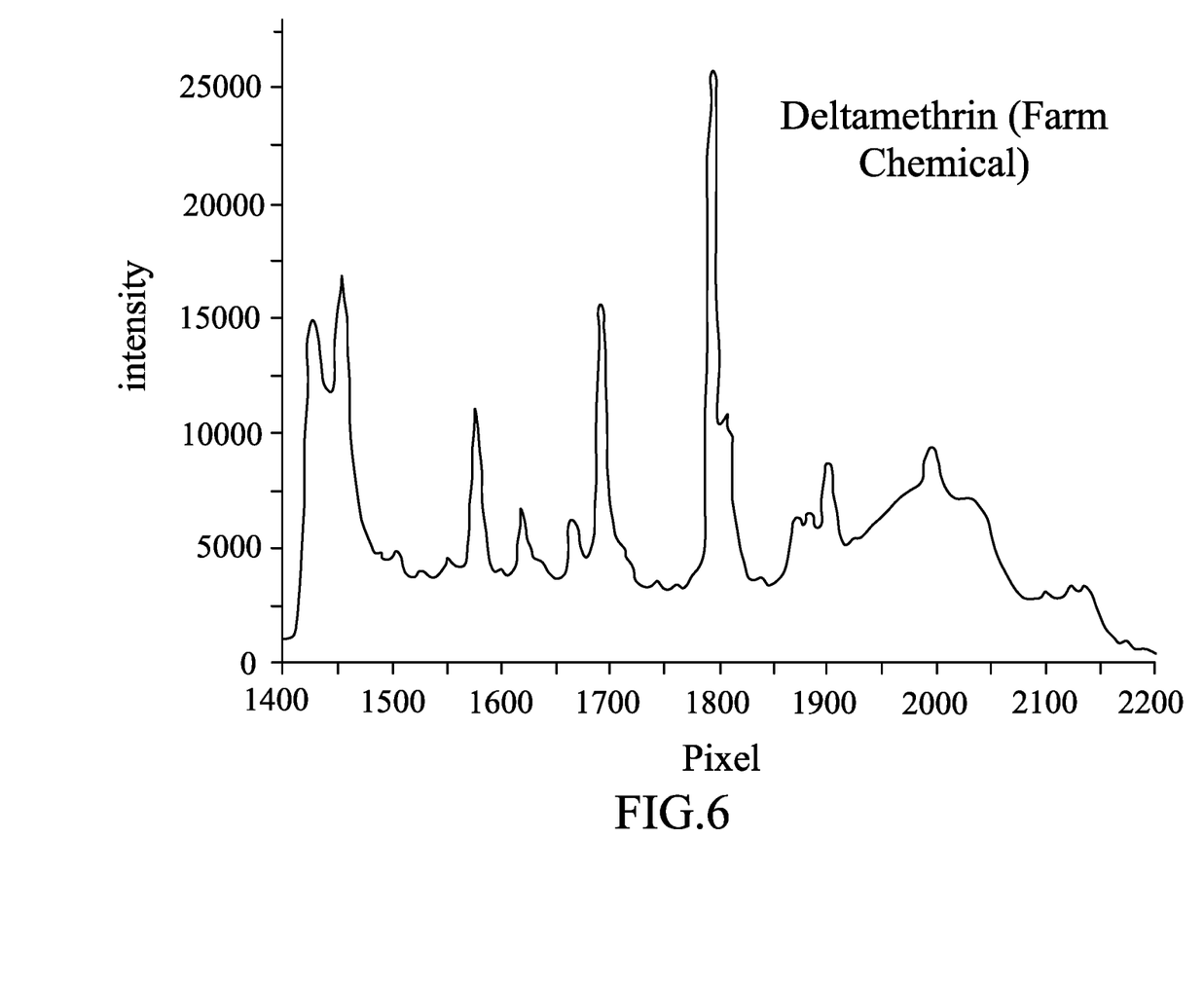
FIGS. 6-10 are schematic diagrams of the Raman spectra of different materials measured by the prototype of the Raman spectrometer of the present disclosure.
Figure 7:
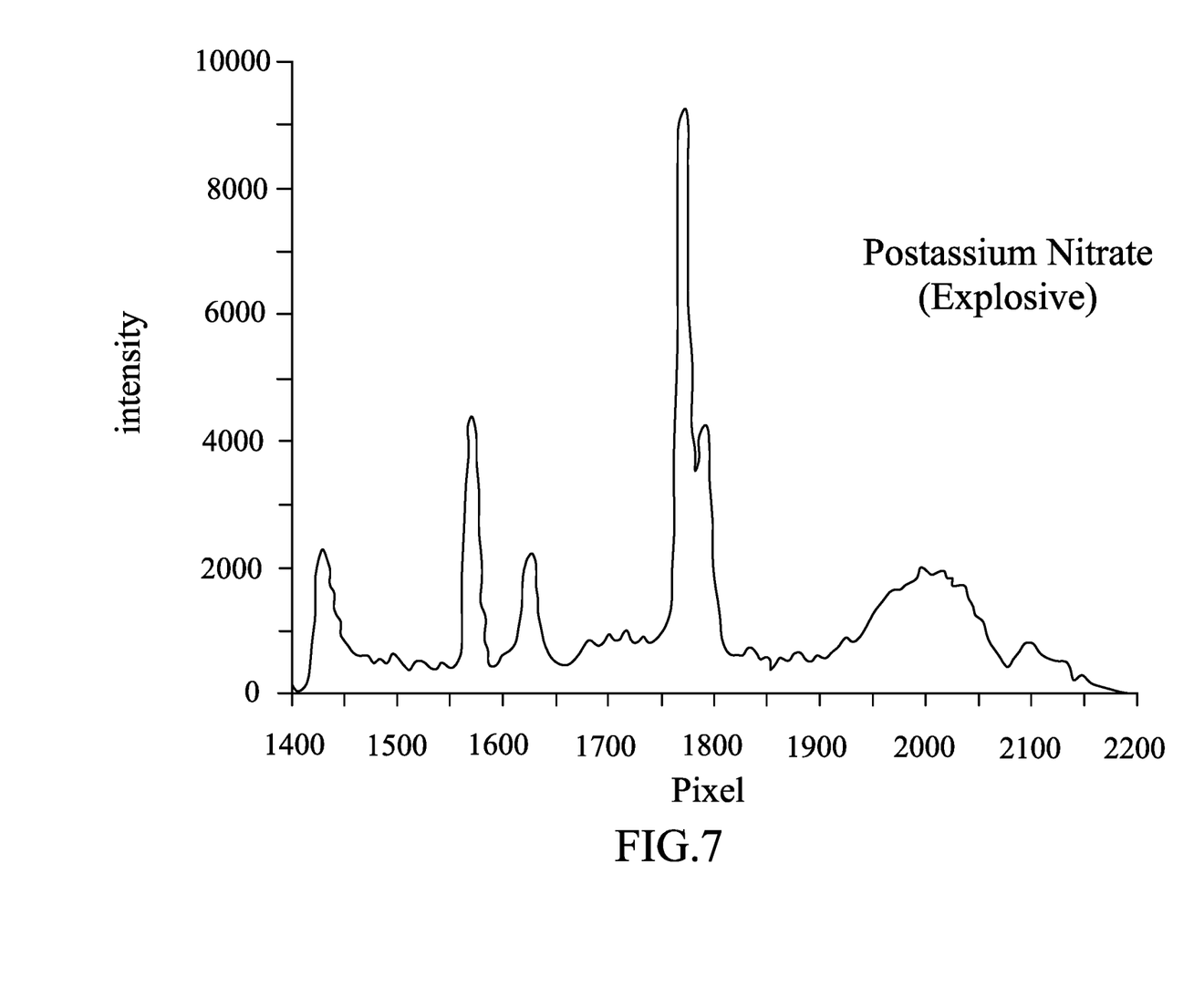
Figure 8:
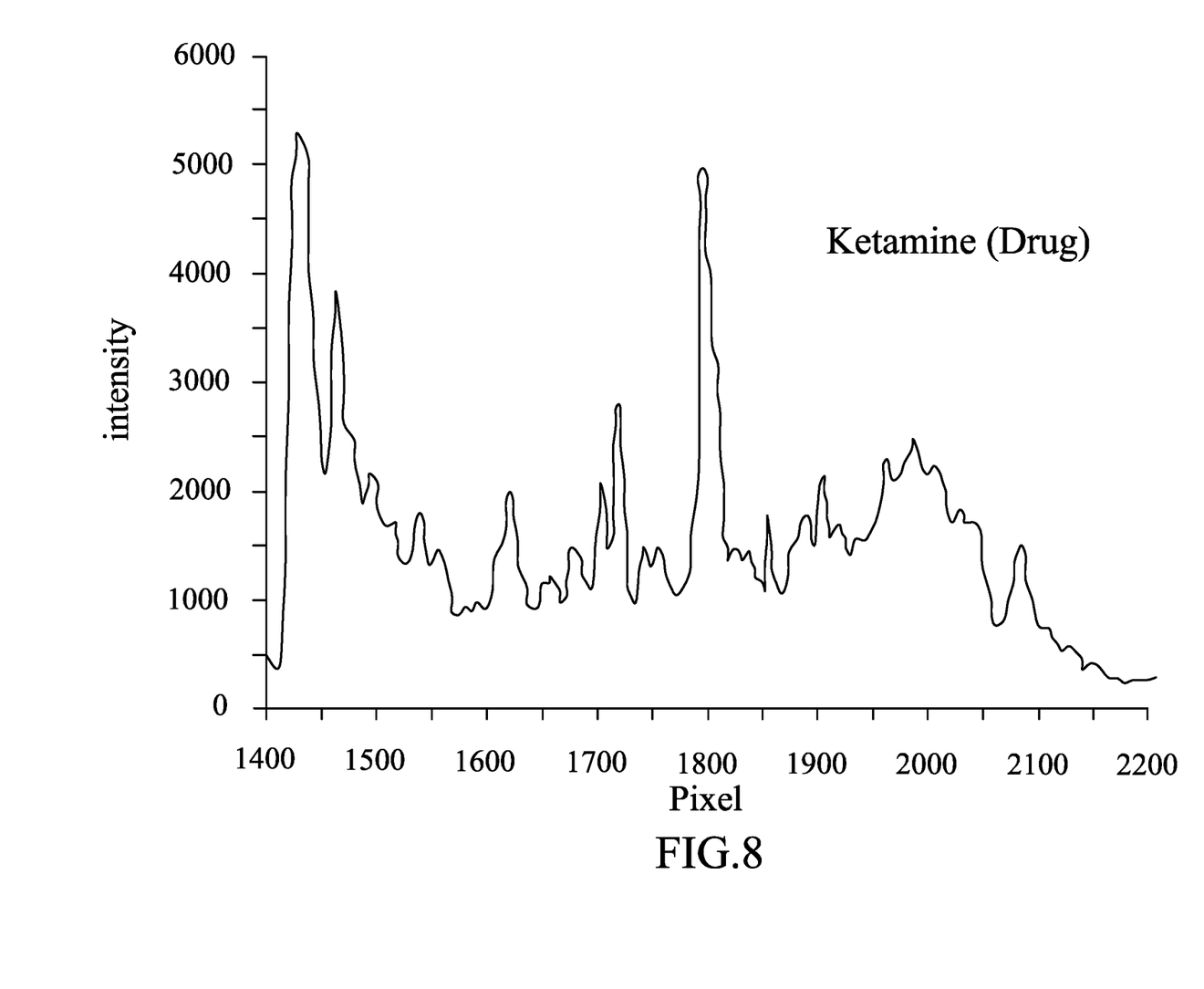
Figure 9:
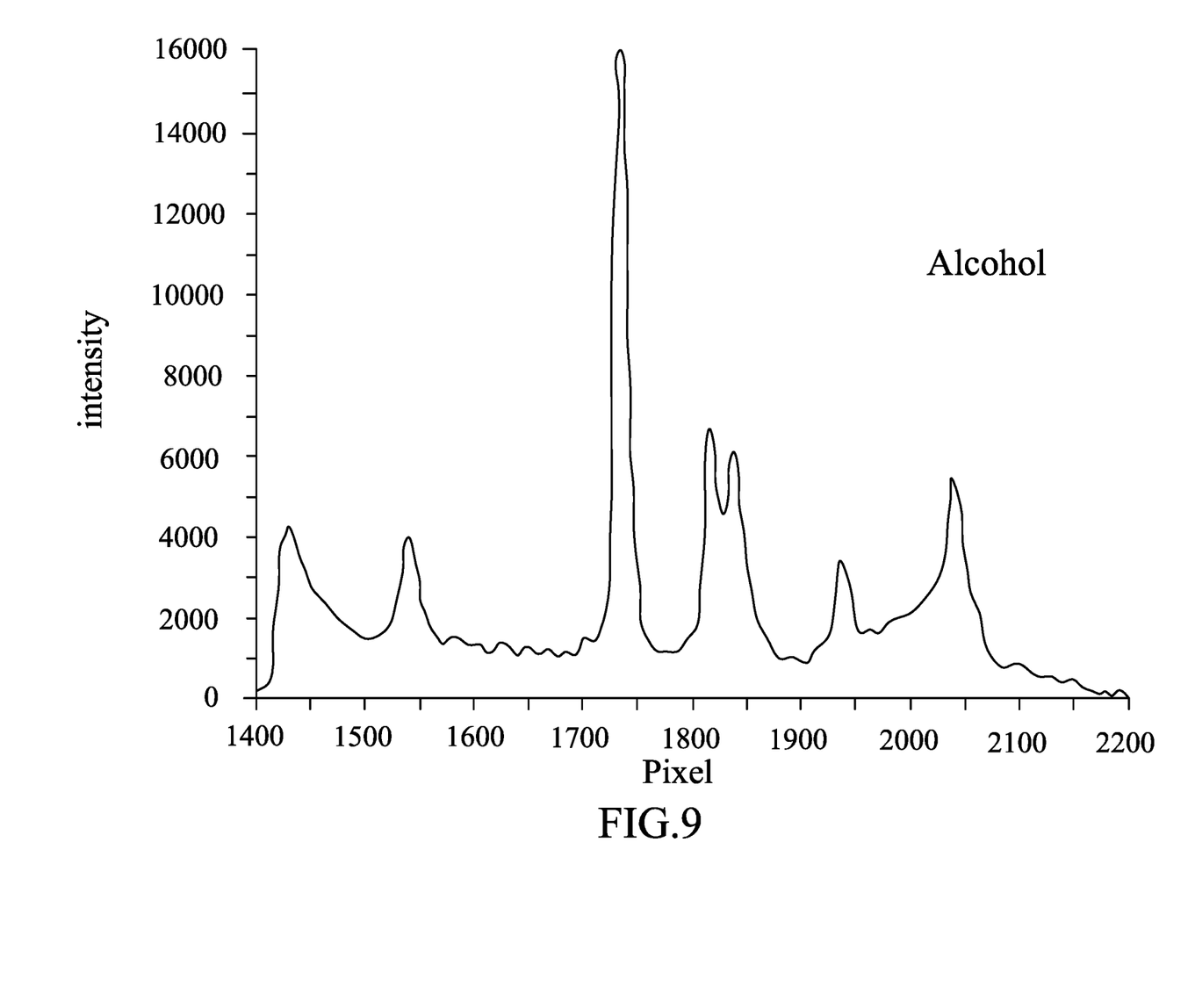
Figure 10:
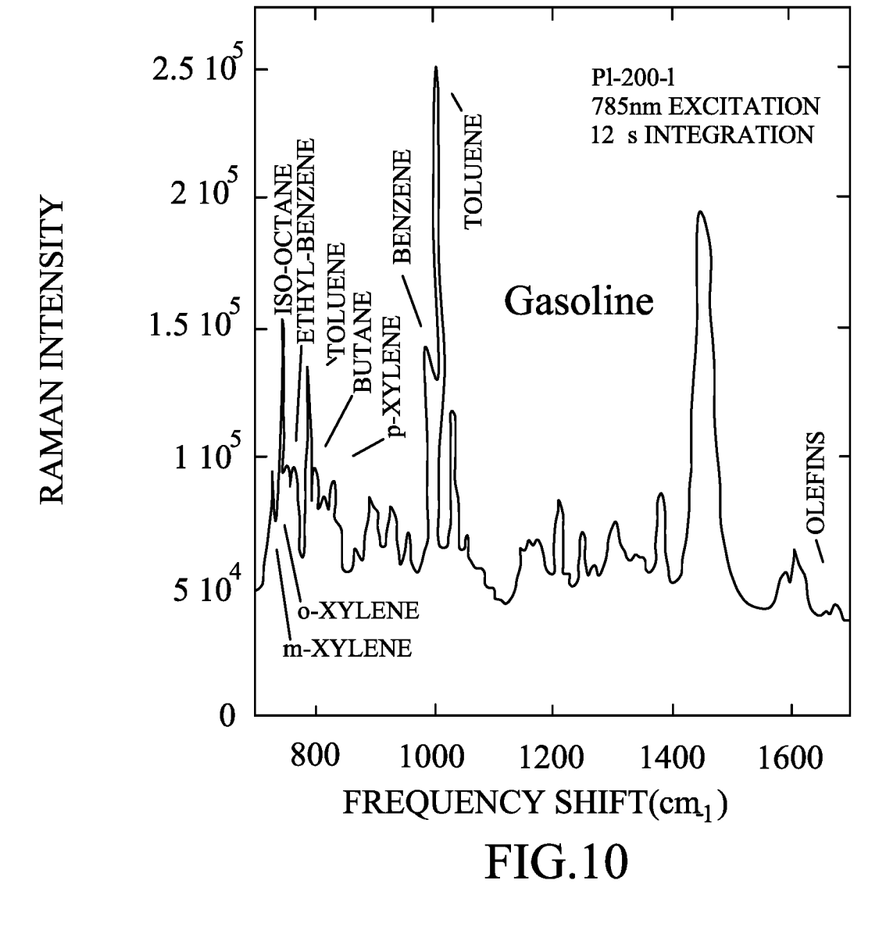

In order to verify the Embodiments 1 and 2, a laser diode with 785 nm is used for producing a prototype, as is shown in FIG. 5. The bottom portion in the left figure is a miniaturized Raman spectrometer, which can be compared to the size of a business card on the top portion in the left figure. The right figure is a circuit board with the same size of the miniaturized Raman spectrometer that sends data and images over a wireless network to the mobile phone and the cloud computer. A lot of solid, liquid and gas tests are made in the present disclosure to obtain good results. FIGS. 6-10 are five examples. Currently, no drinks are allowed to be taken to the air plane in the airports. Only a few seconds are required for measuring whether there is water/drink or alcohol/gasoline in the bottle by using the miniaturized Raman spectrometer of the present disclosure. If the former (the water/drink) is determined, it can be taken to the air plane to reduce passenger's troubles; or if the latter (the alcohol/gasoline) is determined, it will be detained for further investigation. In order to measure minor amounts of farm chemical residues and toxic additives in foods, a silver nitrate reduction method is used to produce a surface-enhanced chip, and the price of is only 5 US Dollars per chip, but it costs 75 US Dollars (about RMB 500) if it's imported from United Kingdom.

Figure 11:
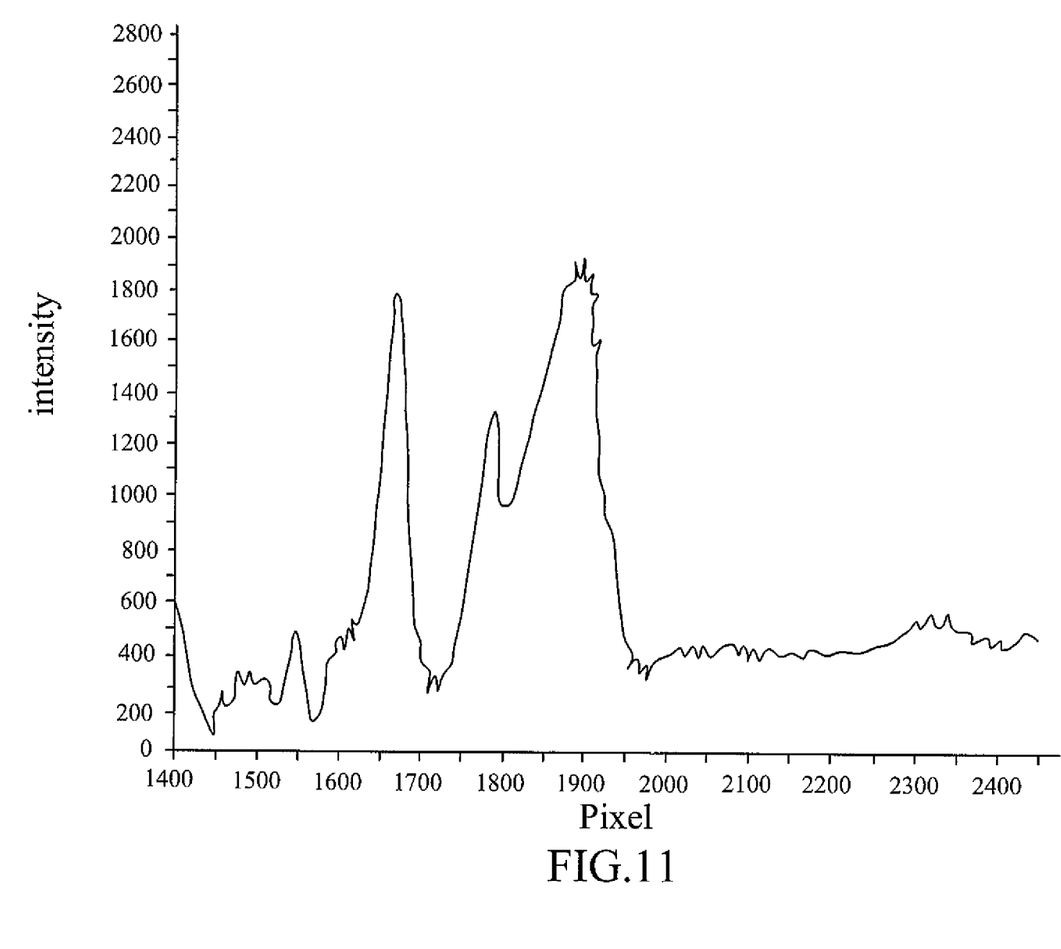
FIG. 11 is a schematic diagram of 1 ppm farm chemical residues measured by adopting a self-made low-cost surface-enhanced chip on the prototype of the Raman spectrometer of the present disclosure.

FIG. 11 shows the measurement result of 666 with a content of 1 ppm measured by adopting a miniaturized Raman spectrometer of the present disclosure in China Jiliang University.

Instead of using a spherical lens as the objective lens, a cylindrical lens is adopted as the objective lens in the present disclosure, such that the focus point of the objective lens becomes larger and less detonatable. The light entering the slit is rectangular, which facilitates the use of matrix-array detectors. Instead of using the optical fiber, the objective lens is directly coupled to the slit having a length smaller than 25 μm, such that the loss of Raman light can be greatly reduced. Instead of using a reflector spectrum system with the F value of 4, a lens system with the F value of 2 is adopted for greatly increasing the luminous flux. Instead of using line-array detectors, matrix-array detectors are adapted for greatly improving the signal-to-noise ratio. A power-hungry and non-interpretable touch screen and a large-sized notebook are not adopted, and its data can be wirelessly transmitted to an interpretable mobile phone and a cloud computer for more complex processing, such that its volume is greatly reduced, making the size of the entire near-infrared Raman spectrometer, including the battery, the same small as a business card. Compared with similar products with a size 5 times larger than the size of the present disclosure, its sensitivity can be at least 10 times higher and its resoluation rate can be at least 2 times higher. The sensitivity of the near-ultraviolet Raman is at least 100 times higher than the sensitivity of the near-infrared Raman.

Therefore, the present disclosure can make the size of the Raman spectrometer the same small as a business card since a power-hungry touch screen and a large-sized notebook are not required, which is convenient for carrying and usage, and its measurement and interpretation results can be seen by interested users anywhere the Internet is available.

Reference in the specification to "one example" or "an example" means that a particular feature, structure, or characteristic described in connection with the example is included in at least an implementation. The appearances of the phrase "in one example" in various places in the specification are not necessarily all referring to the same example. Thus, although examples have been described in language specific to structural features and/or methodological acts, it is to be understood that claimed subject matter may not be limited to the specific features or acts described. Rather, the specific features and acts are disclosed as sample forms of implementing the claimed subject matter.

The above are only preferred examples of the present disclosure is not intended to limit the present disclosure within the spirit and principles of the present disclosure, any changes made, equivalent replacement, or improvement in the protection of the present disclosure should contain within the range.

Those skilled in the art will readily observe that numerous modifications and alterations of the device and method may be made while retaining the teachings of the invention. Accordingly, the above disclosure should be construed as limited only by the meters and bounds of the appended claims.

What is claimed is:

1. A double-channel miniaturized Raman spectrometer, comprising:
   a plurality of sequentially-connected near-infrared laser diodes or near-ultraviolet laser emitters;
   a collimated laser beam expander;
   a first beam splitter, that retards laser light but penetrates laser light and Raman light;
   an objective lens with or without zooming;
   a second beam splitter, that retards laser light but penetrates Raman light;
   a slit;
   a relay optical system, for imaging the laser light and the Raman light scattered from illumination points on a target onto the slit for direct alignment without using optical fibers for indirect alignment;
   two spectral lenses;
   a plurality of line-array or matrix-array CCD or CMOS detectors;
   a GPS; and
   a data processing and wireless transceiver system;
   wherein the data processing and wireless transceiver system transmits GPS, Raman spectrum, and the laser image to a mobile phone and a cloud computer for laser image display, Raman spectrum display, peak location, overlapping peak separation, establishment of spectral library, and/or material identification in order to obtain a result;
   wherein 1-10% area in a middle part of a glass substrate of the first beam splitter is coated with a high-reflection film that retards laser light but penetrates Raman light, and the remaining 90-99% area in the middle part of the glass substrate of the first beam splitter is coated with an anti-reflective film that penetrates laser light and Raman light, such that the first beam splitter is capable of retarding laser light and penetrating laser light.

2. The double-channel miniaturized Raman spectrometer according to claim 1, wherein the plurality of sequentially-connected near-infrared laser diodes has a wavelength of 785 nm, or the plurality of sequentially-connected near-ultraviolet laser emitters has a wavelength of 266 nm.

3. The double-channel miniaturized Raman spectrometer according to claim 1, wherein the objective lens with or without zooming is a cylindrical lens with a rectangular laser illumination area, or the objective lens with or without zooming is a spherical/aspherical lens, and a size of the objective lens with or without zooming does not exceed ¼", and a F value is not greater than 1.

4. The double-channel miniaturized Raman spectrometer according to claim 1, wherein the second beam splitter reflects the laser light to a laser camera, and transmits the Raman light to a long-pass filter and a relay lens of the relay optical system.

5. The double-channel miniaturized Raman spectrometer according to claim 1, wherein spectrum-forming system includes a lens with a small F value, a grating, and a plurality of near-infrared or near-ultraviolet matrix-array CCD detectors.

6. The double-channel miniaturized Raman spectrometer according to claim 1, wherein the spectrum-forming system includes a narrow-band tunable filter with rotating angle or an acousto-optic/liquid crystal tunable filter, and a photomultiplier or an avalanche photodiode (APD).

7. The double-channel miniaturized Raman spectrometer according to claim 1, wherein an F value of the relay optical system is at least two times of the F value of the objective lens, and the relay optical system images the Raman light excited and scattered from the target onto a rectangular slit, wherein a Z first direction of the rectangular slit is not more than 100 μm, and a second direction of the rectangular slit is not more than 3 mm.

8. The double-channel miniaturized Raman spectrometer according to claim 1, wherein a spectrum-forming system uses a narrow-band tunable filter with rotating angle or an acousto-optic/liquid crystal tunable filter for dispersion, and a wavelength-by-wavelength tuning scan is performed on a single or multiple photodiodes (PD), photomultipliers (PMT), ICCD or avalanche photodiodes (APD) using a lens in order to form a spectrum, such that a hyperspectral image is obtained if the matrix-array CCD or CMOS detectors are adopted.

9. A double-channel miniaturized Raman spectrometer, comprising:
   a plurality of sequentially-connected near-infrared laser diodes or near-ultraviolet laser emitters;
   a collimated laser beam expander;
   a first beam splitter, that retards laser light but penetrates laser light and Raman light;
   an objective lens with or without zooming; to a second beam splitter, that retards laser light but penetrates Raman light;
   a slit;
   a relay optical system, for imaging the laser light and the Raman light scattered from illumination points on a target onto the slit for direct alignment without using optical fibers for indirect alignment;
   two spectral lenses;
   a plurality of line-array or matrix-array CCD or CMOS detectors;
   a GPS; and
   a data processing and wireless transceiver system;
   wherein the data processing and wireless transceiver system transmits GPS, Raman spectrum, and the laser image to a mobile phone and a cloud computer for laser image display, Raman spectrum display, peak location, overlapping peak separation, establishment of spectral library, and/or material identification in order to obtain a result;
   wherein a middle part of the first beam splitter is coated with a dielectric film that retards laser light but penetrates Raman light, and the remaining part of the first beam splitter is coated with an anti-reflective film that penetrates laser light and Raman light, such that the first beam splitter is capable of retarding laser light and penetrating laser light.

\* \* \* \* \*